United States Patent
Matolia et al.

(10) Patent No.: US 12,261,892 B2
(45) Date of Patent: Mar. 25, 2025

(54) PUBLIC LAND MOBILE NETWORK SUPPORT FOR A STAND-ALONE NON-PUBLIC ACCESS NETWORK

(71) Applicant: Apple Inc., Cupertino, CA (US)

(72) Inventors: Rohit R. Matolia, Surat (IN); Alosious Pradeep Prabhakar, Singapore (SG); Han Pu, Hong Kong (HK); Krisztian Kiss, Hayward, CA (US); Mohammed Mehdi Ait Tahar, Dubai (AE); Mohammed Sadique, Auburn (AU); Nitin A. Naik, San Jose, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 649 days.

(21) Appl. No.: 17/593,673

(22) PCT Filed: May 5, 2021

(86) PCT No.: PCT/US2021/070509
§ 371 (c)(1),
(2) Date: Sep. 22, 2021

(87) PCT Pub. No.: WO2021/226631
PCT Pub. Date: Nov. 11, 2021

(65) Prior Publication Data
US 2022/0311810 A1    Sep. 29, 2022

(30) Foreign Application Priority Data
May 7, 2020    (IN) .............................. 202041019487

(51) Int. Cl.
*H04W 4/00*    (2018.01)
*H04L 65/1016*    (2022.01)
(Continued)

(52) U.S. Cl.
CPC ...... *H04L 65/1073* (2013.01); *H04L 65/1016* (2013.01); *H04L 65/1053* (2013.01);
(Continued)

(58) Field of Classification Search
CPC ............. H04L 65/1073; H04L 65/1016; H04L 65/1053; H04L 65/1104; H04W 76/12
(Continued)

(56) References Cited

U.S. PATENT DOCUMENTS

| 10,326,804 B1* | 6/2019 | Agarwal | H04W 36/0022 |
| 10,791,221 B1* | 9/2020 | Vislocky | H04M 3/5116 |

(Continued)

FOREIGN PATENT DOCUMENTS

| CN | 107113338 | 8/2017 |
| CN | 109155908 | 1/2019 |

(Continued)

OTHER PUBLICATIONS

Motorola Mobility et al., "Access Network Selection for Trusted Non-3GPP access"; 3GPP SA WG2 Meeting #1291; S2-1810966; Oct. 18, 2018; 10 sheets.
(Continued)

*Primary Examiner* — Marceau Milord
(74) *Attorney, Agent, or Firm* — Fay Kaplun & Marcin, LLP

(57) ABSTRACT

A user equipment (UE) that is registered to a stand-alone non-public network (SNPN) can also access services on a public land mobile network (PLMN). The UE accesses the PLMN by transmitting a first signal to a data network, receiving a second signal from the data network in response to the first signal, wherein the second signal identifies a PLMN that is configured to be accessed by the UE via the data network and transmitting a session initiation protocol (SIP) registration request to the PLMN via the data network.

16 Claims, 10 Drawing Sheets

(51) Int. Cl.
*H04L 65/1053* (2022.01)
*H04L 65/1073* (2022.01)
*H04L 65/1104* (2022.01)
*H04W 76/12* (2018.01)
*H04W 4/90* (2018.01)
*H04W 80/10* (2009.01)
*H04W 84/04* (2009.01)

(52) U.S. Cl.
CPC ......... *H04L 65/1104* (2022.05); *H04W 76/12* (2018.02); *H04W 4/90* (2018.02); *H04W 80/10* (2013.01); *H04W 84/04* (2013.01)

(58) Field of Classification Search
USPC .............................. 455/435.1, 445, 461, 463
See application file for complete search history.

(56) References Cited

U.S. PATENT DOCUMENTS

| | | | |
|---|---|---|---|
| 11,349,986 B2* | 5/2022 | Agarwal | H04L 65/1104 |
| 11,785,434 B2* | 10/2023 | Ravichandran | H04W 4/12 |
| | | | 455/435.1 |
| 11,956,756 B2* | 4/2024 | Zhu | H04W 68/02 |
| 11,979,927 B2* | 5/2024 | Munoz De La Torre Alonso | H04W 76/12 |
| 2015/0350983 A1* | 12/2015 | Kwok | H04L 65/1016 |
| | | | 370/331 |
| 2015/0365790 A1* | 12/2015 | Edge | H04W 76/50 |
| | | | 455/456.1 |
| 2016/0255536 A1* | 9/2016 | Venkatraman | H04W 28/0252 |
| | | | 370/329 |
| 2016/0306813 A1* | 10/2016 | Meredith | H04W 4/029 |
| 2016/0309379 A1* | 10/2016 | Pelletier | H04W 76/15 |
| 2016/0366574 A1* | 12/2016 | Dahan | H04W 36/0011 |
| 2018/0041855 A1* | 2/2018 | Chen | H04L 63/0853 |
| 2018/0158299 A1* | 6/2018 | Bogdan | H04N 23/56 |
| 2019/0014462 A1 | 1/2019 | Edge et al. | |
| 2019/0059024 A1* | 2/2019 | Mufti | H04W 48/02 |
| 2019/0075552 A1* | 3/2019 | Yu | H04W 24/10 |
| 2019/0190996 A1* | 6/2019 | Sabeur | H04L 65/80 |
| 2019/0190997 A1* | 6/2019 | Sabeur | H04L 65/1104 |
| 2019/0208393 A1* | 7/2019 | Bakker | H04L 65/1069 |
| 2019/0281506 A1* | 9/2019 | Chiang | H04W 76/19 |
| 2019/0297121 A1* | 9/2019 | Qiao | H04L 65/1016 |
| 2019/0313229 A1* | 10/2019 | Chiang | H04W 4/90 |
| 2019/0342874 A1* | 11/2019 | Davydov | H04W 72/23 |
| 2019/0373515 A1* | 12/2019 | Balasubramanian | H04L 43/16 |
| 2019/0394833 A1* | 12/2019 | Talebi Fard | H04W 68/005 |
| 2020/0162879 A1* | 5/2020 | Lotfallah | H04W 4/90 |
| 2020/0252440 A1* | 8/2020 | El-Gawady | H04L 65/1059 |
| 2020/0351406 A1* | 11/2020 | Patel | H04L 65/00 |
| 2021/0058784 A1* | 2/2021 | Kedalagudde | H04W 48/18 |
| 2021/0092664 A1* | 3/2021 | Lai | H04W 60/04 |
| 2021/0136536 A1* | 5/2021 | Kumar | H04L 65/1016 |
| 2021/0136717 A1* | 5/2021 | Zhu | H04L 69/322 |
| 2021/0168594 A1* | 6/2021 | Wu | H04W 88/16 |
| 2021/0250384 A1* | 8/2021 | Venkataraman | H04L 65/1104 |
| 2022/0053603 A1* | 2/2022 | Talebi Fard | H04W 60/00 |
| 2022/0263944 A1* | 8/2022 | Agarwal | H04L 65/1096 |
| 2022/0286993 A1* | 9/2022 | Youn | H04W 8/06 |

FOREIGN PATENT DOCUMENTS

| | | |
|---|---|---|
| EP | 3614738 | 2/2020 |
| WO | 2017/201062 | 11/2017 |

OTHER PUBLICATIONS

"3rd Generation Partnership Project, Technical Specification Group Services and System Aspects; System architecture for the 5G System (5GS); Stage 2; (Release 16)"; 3GPP 23501-G40; Mar. 27, 2020; pp. 1-30, 19, 221, 276-279.

"3rd Generation Partnership Project, Technical Specification Group Core Network and Terminals; IP multimedia call control protocol based on Session Initiation Protocol (SIP) and Session Description Protocol (SDP); Stage 3; (Release 16)"; 3GPP 24229-G501; Mar. 27, 2020; 3 sheets.

OPPO, "Key Issue: Support for IMS and emergency services for SNPN"; 3GPP SA WG2 Meeting #135; S2-1909242; Oct. 3, 2019; 3 sheets.

Qualcomm Incorporated et al., "FS_Vertical_LAN: Access to PLMN/NPN services via N3IWF"; SA WG2 Meeting #S2-129; 3GPP S2-1810074; Oct. 19, 2018; 9 sheets.

Ericsson et al., "Vertical LAN: Access to PLMN services using Dual Radio in UE"; 3GPP SA WG2 Meeting #S2-129; S2-1811376; Oct. 18, 2018; 5 sheets.

Apple, "KI #3, New Sol: SNPN IMS Access with PLMN support"; 3GPP SA WG2 Meeting #139E; S2-2003840r02; Jun. 1-12, 2020; 5 sheets.

3GPP TS 23.501, "System architecture for the 5G System (5GS)", Release 16, V16.4.0, Mar. 2020, 3 sheets.

* cited by examiner

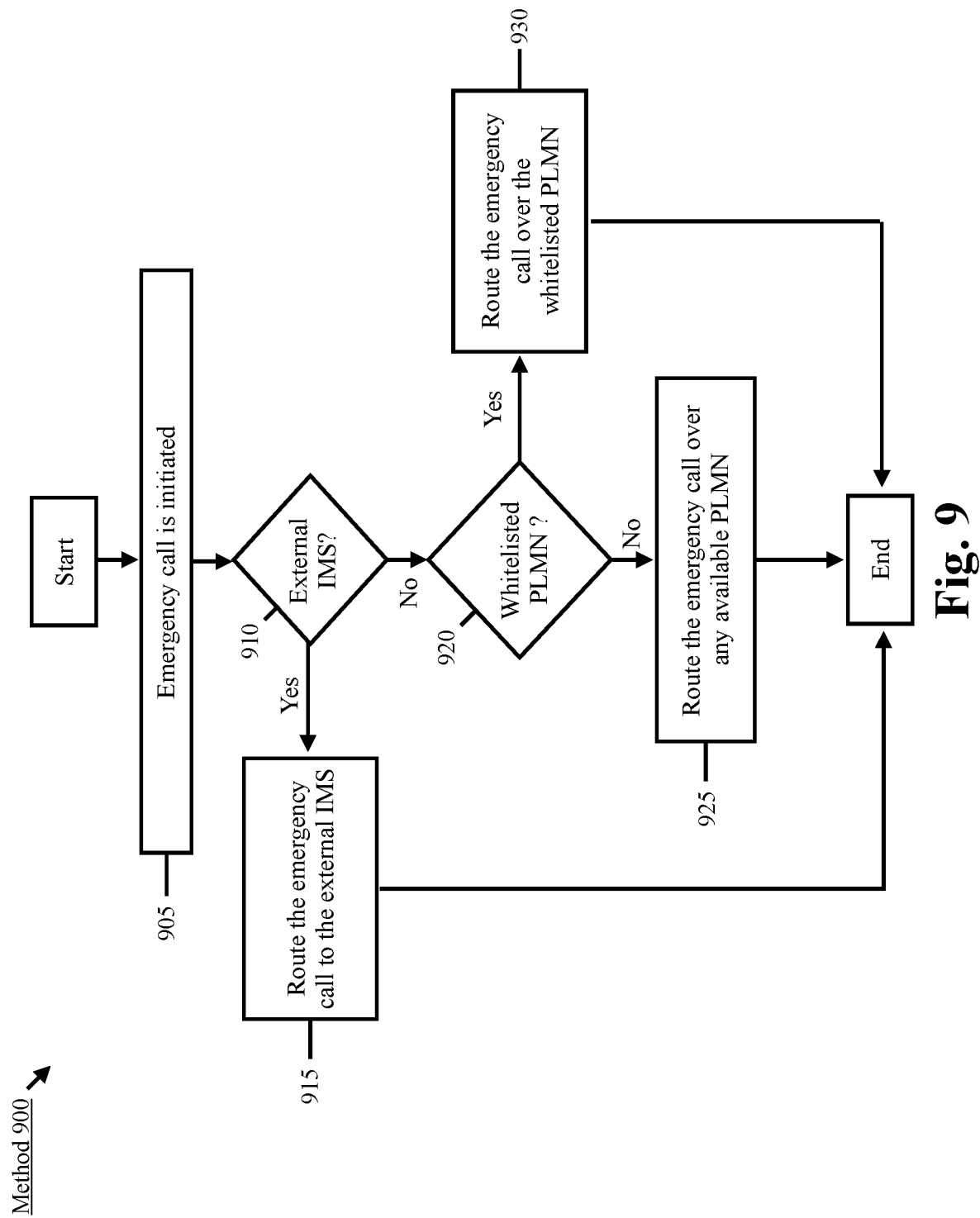

PUBLIC LAND MOBILE NETWORK SUPPORT FOR A STAND-ALONE NON-PUBLIC ACCESS NETWORK

BACKGROUND

A user equipment (UE) may connect to a stand-alone non-public network (SNPN). A SNPN generally refers to a 5G system deployed for non-public use that does not rely on the network functions of a public land mobile network (PLMN). However, the UE may access a PLMN while connected to the SNPN. Accordingly, there exists a need for mechanisms configured to provide a UE with PLMN services while connected to the SNPN.

SUMMARY

In some exemplary embodiments, a method is performed by a user equipment (UE) registered to a stand-alone non-public network (SNPN). The method includes transmitting a first signal to a data network, receiving a second signal from the data network in response to the first signal, wherein the second signal identifies a public land mobile network (PLMN) that is configured to be accessed by the UE via the data network and transmitting a session initiation protocol (SIP) registration request to the PLMN via the data network.

In other exemplary embodiments, a user equipment (UE) having a transceiver and a processor is provided. The transceiver is configured to communicate with one or more networks. The processor is configured to perform operations that include registering with a stand-alone non-public network (SNPN), transmitting a first signal to a data network via the SNPN, receiving a second signal from the data network in response to the first signal, wherein the second signal identifies a public land mobile network (PLMN) that is configured to be accessed via the data network and transmitting a session initiation protocol (SIP) registration request to the PLMN via the data network.

In still further exemplary embodiments, a method is performed by a private branch exchange of a stand-alone non-public network (SNPN). The method includes transmitting a first signal to a data network, receiving a second signal from the data network in response to the first signal, wherein the second signal identifies a public land mobile network (PLMN) that is configured to be accessed via the data network and transmitting a session initiation protocol (SIP) registration request to the PLMN via the data network.

BRIEF DESCRIPTION OF THE DRAWINGS

FIG. 9 shows a method for selecting a PLMN to use for an emergency call according to various exemplary embodiments.

DETAILED DESCRIPTION

Figure 1:
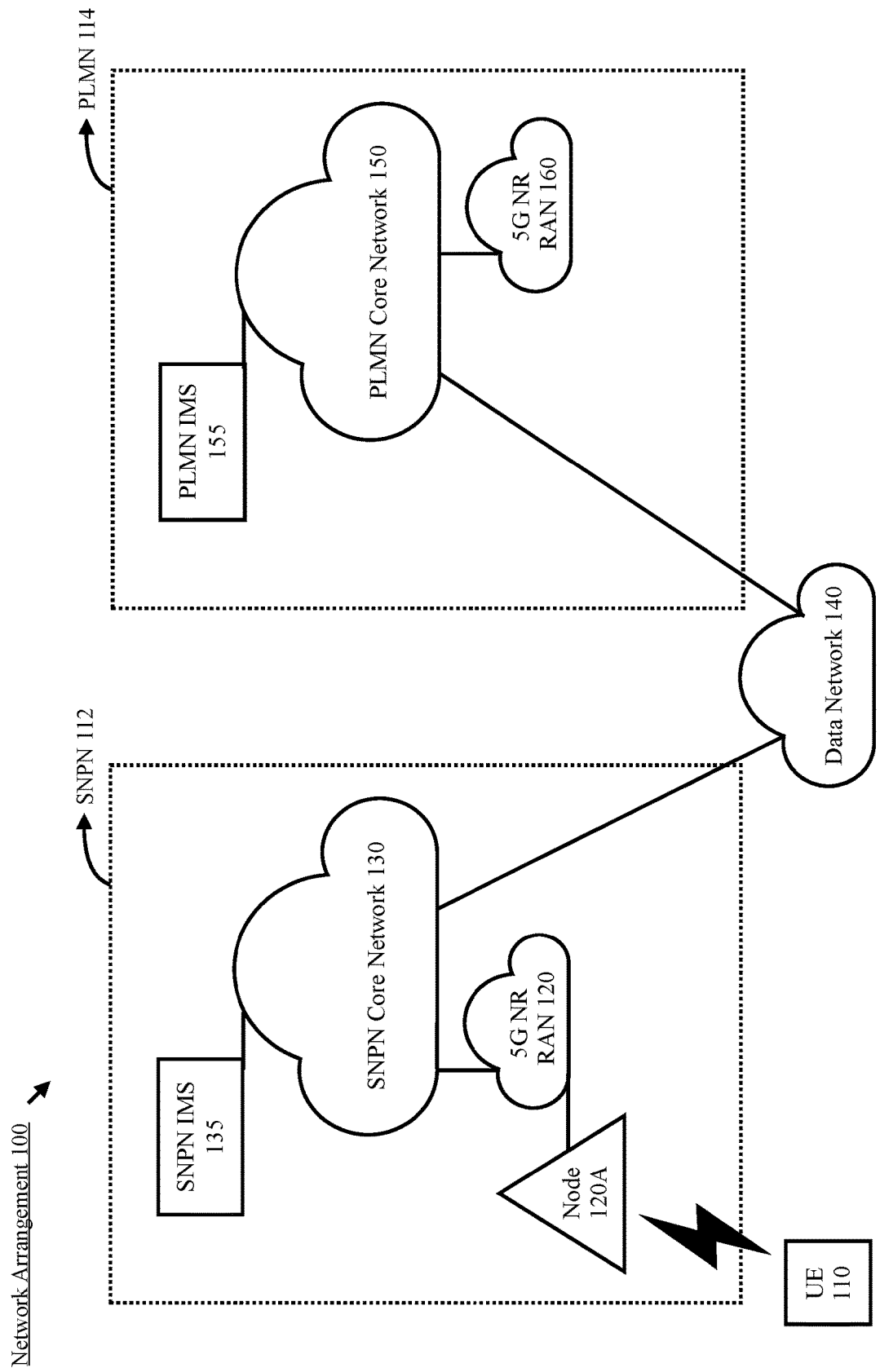
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to providing a user equipment (UE) connected to a stand-alone non-public network (SNPN) with public land mobile network (PLMN) services.

Throughout this description, the term "SNPN" generally refers to a 5G system deployed for non-public use that does not rely on the network functions of a PLMN. Thus, the SNPN may be configured to be utilized by a private entity and may be isolated from public access. Specific examples of the physical and virtual components that may be included in a SNPN will be described in detail below.

The exemplary embodiments are described with regard to a UE connected to the SNPN. The UE may represent any electronic component that may establish a connection to a network and is configured with the hardware, software, and/or firmware to exchange information and data with the network. When operating in SNPN access mode, the UE may be configured to access one or more SNPNs. However, any reference to a SNPN, a UE or SNPN access mode is merely provided for illustrative purposes. Different entities may refer to similar concepts by different names.

The UE may connect to both the SNPN and the PLMN simultaneously. For example, the UE may register with the PLMN (using the credentials of that PLMN) via the SNPN. Thus, the UE may have access to both SNPN and PLMN services. The exemplary embodiments are described with regard to providing the UE with internet protocol (IP) multimedia services and emergency services from the PLMN while connected to the SNPN. However, any reference to the UE accessing a particular type of PLMN service is merely provided for illustrative purposes. Those skilled in the art will understand that the exemplary concepts described herein may be applicable to providing a UE operating in SNPN access mode with any type of PLMN service.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a SNPN 112 and a PLMN 114. The SNPN 112 may be deployed by a private entity and isolated from public networks. However, as indicated above, the UE 110 may access the PLMN 114 via the SNPN 112. Similarly, while beyond the scope of the exemplary embodiments, UEs with credentials to access the SNPN 112 may be permitted to access the SNPN 112 via a public network (e.g., the PLMN 114).

The UE 110 may wirelessly access the SNPN 112 via a 5G new radio (NR) radio access network (RAN) (5G NR RAN) 120. For example, the 5G NR RAN 120 may include one or more nodes, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. However, it should be understood that the UE 110 may also access the SNPN 112 over a wired connection or using any other appropriate type of RAN. Therefore, the UE 110 may include, at least, a 5G NR chipset to communicate with the 5G NR-RAN 120.

In the network arrangement 100, the UE 110 may connect to the 5G NR RAN 120 via the node 120A. Those skilled in the art will understand that any association procedure may be performed for the UE 110 to connect to the 5G NR-RAN 120. For example, the UE 110 may be associated with the private entity that deployed the SNPN 112. Thus, the UE 110 may be provisioned with credentials to access the SNPN 112. When operating in SNPN access mode, the UE 110 may be configured to search for and identify nodes of the SNPN 112 (e.g., node 120A). Upon detecting the presence of the 5G NR-RAN 120, the UE 110 may transmit the corresponding credential information to associate with the 5G NR-RAN 120. More specifically, the UE 110 may associate with a specific node (e.g., the node 120A of the 5G NR-RAN 120). Reference to one node and one RAN is merely provided for illustrative purposes. Those skilled in the art will understand that an actual SNPN may include any appropriate number of RANs and corresponding nodes.

In addition to the 5G NR RAN 120, the SNPN 112 may also include an SNPN core network 130 and an SNPN IMS 135. The SNPN core network 130 may be considered to be the interconnected set of components that manages the operation and traffic of the cellular network. The SNPN core network 130 also manages the traffic that flows between the cellular network and the Data network 140. The SNPN IMS 135 may be generally described as an architecture for delivering multimedia services to the UE 110 using the IP protocol. The SNPN IMS 135 may communicate with the SNPN core network 130 and the Data network 140 to provide the multimedia services to the UE 110. In some embodiments, the functionality described for the SNPN core network 130 and/or the SNPN IMS 135 may include a cloud implementation such as a set of virtual or hardware servers hosting firmware. The exemplary embodiments are not limited to any particular network configuration and may be applicable to any appropriate arrangement of hardware, software and/or firmware.

The UE 110 may access network services from the PLMN 114 while connected to the SNPN 112. In some embodiments, this may include the UE 110 connecting to the PLMN 114 via the SNPN 112. For example, once registered with the SNPN core network 130, the UE 110 may utilize the SNPN 112 for non-third generation partnership program (3GPP) access to the PLMN 114 via the data network 140. The UE 110 may then register with the PLMN 114 (using the credential of the PLMN 114) and receive network services from the PLMN 114 via the SNPN 112. This functionality may be facilitated by various network functions on both the SNPN 112 side and the PLMN 114 side. Specific examples of some of the core network functions that may be deployed by the SNPN 112 and the PLMN 114 will be described in more detail below with regard to the schematic overview 400 of FIG. 4 and signaling diagrams 500-800 of FIGS. 5-8.

As indicated above, the Data network 140 may be used to facilitate communication between the SNPN 112 and the PLMN 114. In this exemplary embodiment, the data network 140 may refer to the Internet. However, reference to the internet is merely provided for illustrative purposes. Those skilled in the art will understand that the data network 140 may represent any appropriate type of data network.

The PLMN 114 may represent a cellular network that may be deployed by a cellular provider (e.g., Verizon, AT&T, Sprint, T-Mobile, etc.) over a particular geographical location. The UE 110 be permitted to access the PLMN 114. For example, the UE 110 and/or the user thereof may have a contract and credential information (e.g., stored on a SIM card) to utilize the PLMN 114. In another example, the UE 110 may have a contract with a cellular provider that has an agreement with the cellular provider of the PLMN 114. Thus, in this type of scenario, UEs with a home PLMN that has an agreement with the PLMN 114 may be permitted to utilize the PLMN 114. In a further example, the UE 110 be permitted to utilize the PLMN 114 for emergency services. Accordingly, there are a variety of different scenarios in which the UE 110 may be permitted to utilize the PLMN 114. The exemplary embodiments may apply to any scenario in which the UE 110 is configured to utilize the PLMN 114.

The UE 110 may directly access the PLMN 114 via the 5G NR RAN 160. For example, the 5G NR RAN 160 may include one or more nodes, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. Upon detecting the presence of the 5G NR-RAN 160, the UE 110 may transmit the corresponding credential information to associate with the 5G NR RAN 160. More specifically, the UE 110 may associate with a specific node (not pictured) of the 5G NR RAN 160. However, Reference to one RAN is merely provided for illustrative purposes. Those skilled in the art will understand that an actual PLMN may include any appropriate number of RANs and corresponding nodes.

As described above, the UE 110 may access the PLMN 114 via the SNPN 112 or directly via the 5G NR RAN 160. However, it should be understood that the UE 110 may also access the PLMN 114 over a wired connection or using any other appropriate type of RAN. Therefore, the UE 110 may include, at least, a 5G NR chipset to communicate with the 5G NR-RAN 160.

In addition to the 5G NR RAN 160, the PLMN 114 may include a PLMN core network 150 and a PLMN IMS 155. The PLMN core network 150 may be considered to be the interconnected set of components that manages the operation and traffic of the cellular network. The PLMN core network 150 also manages the traffic that flows between the cellular network and the Data network 140. Those skilled in the art will understand that in an actual network arrangement the PLMN 114 may share a core network with other PLMNs.

As mentioned above, the UE 110 may receive network services from the PLMN 114 via the SNPN 112. This functionality may be facilitated by various network functions on both the SNPN 112 side and the PLMN 114 side. Specific examples of some of the core network functions that may be deployed by the SNPN 112 and the PLMN 114 will be described in more detail below with regard to the schematic overview 400 of FIG. 4 and signaling diagrams 500-800 of FIGS. 5-8.

The PLMN IMS 155 may be generally described as an architecture for delivering multimedia services to the UE 110 using the IP protocol. The PLMN IMS 155 may communicate with the PLMN core network 150 and the Data network 140 to provide the multimedia services to the UE 110. As will be described in more detail below, the exemplary embodiments include mechanisms for providing the UE 110 with network services from the PLMN IMS 155 via the SNPN 112. In some embodiments, the functionality described for the PLMN core network 150 and/or the PLMN IMS 155 may include a cloud implementation such as a set of virtual or hardware servers hosting firmware. The exemplary embodiments are not limited to any particular network arrangement configuration and may be applicable to any appropriate arrangement of hardware, software and/or firmware.

Figure 2:
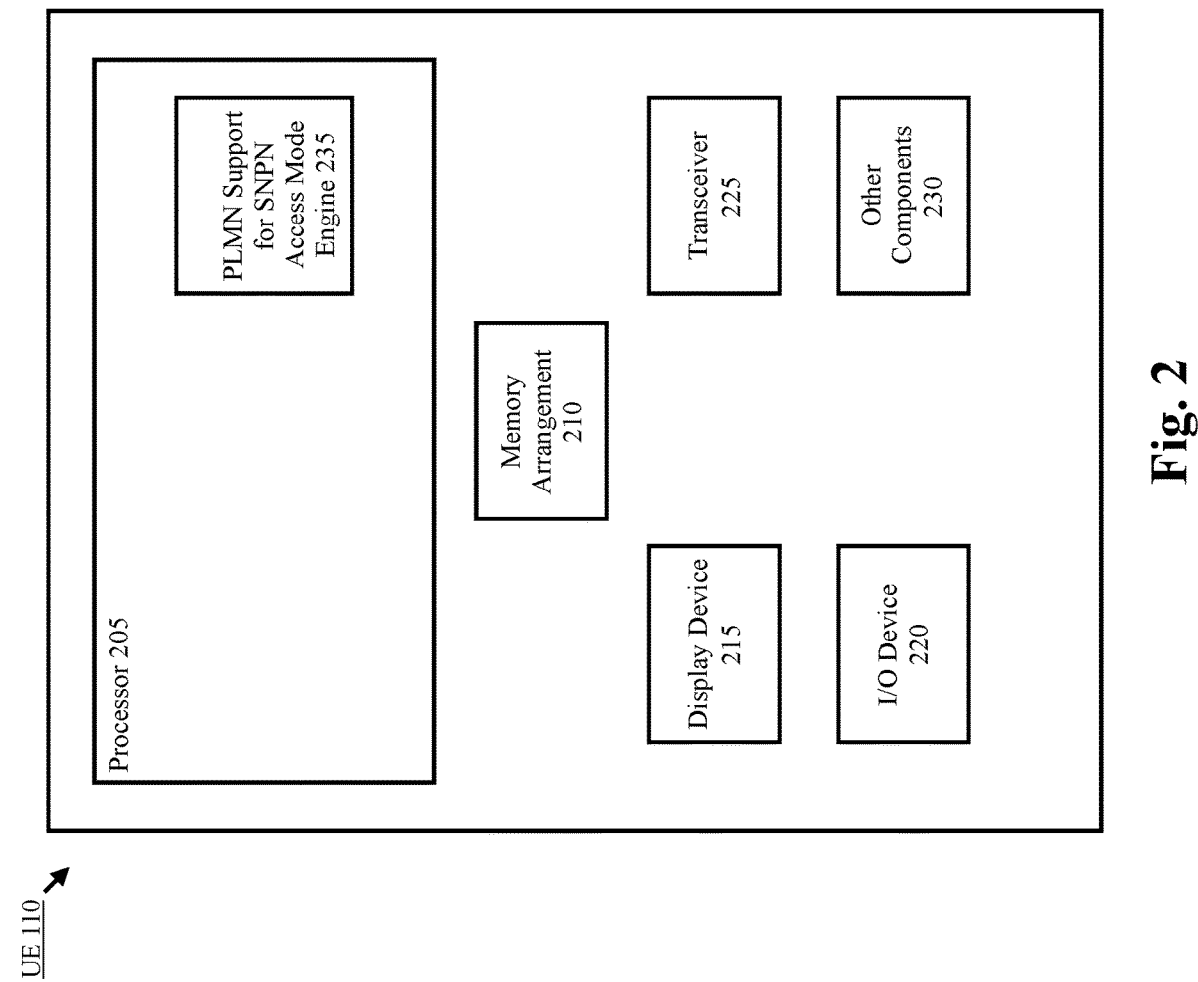
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a PLMN support for SNPN access mode engine 235. The PLMN support for SNPN access mode engine 235 may perform various operations related to registering and receiving network services from a PLMN while the UE 110 is operating in SNPN access mode.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR RANs 120, 160. Accordingly, the transceiver 225 may operate on a variety of different frequencies or channels (e.g., set of consecutive frequencies).

The exemplary embodiments include mechanisms for providing the UE 110 with PLMN services while connected to the SNPN 112. In a first aspect, the exemplary embodiments relate to implementing a uniform resource identifier (URI) format that is used for transmitting/receiving SIP invites from SNPN connected UEs during session initiation protocol (SIP) signaling. The exemplary URI format and examples of using the exemplary URI format for mobile originating (MO) and mobile terminating (MT) calls with regard to the UE 110 in SNPN access mode will be described in more detail below. However, the exemplary embodiments are not required to utilize the exemplary URI format described below and may utilize any appropriate URI format.

Those skilled in the art will understand that SIP generally refers to a signaling protocol that may be used for establishing and maintaining an IP multimedia communication session between two remote endpoints. For example, SIP signaling may be used to create a communication session between the UE 110 and a further UE (or any other type of remote endpoint). This communication session may then be used to exchange multimedia data (e.g., voice call, video call, etc.).

Figure 3A:
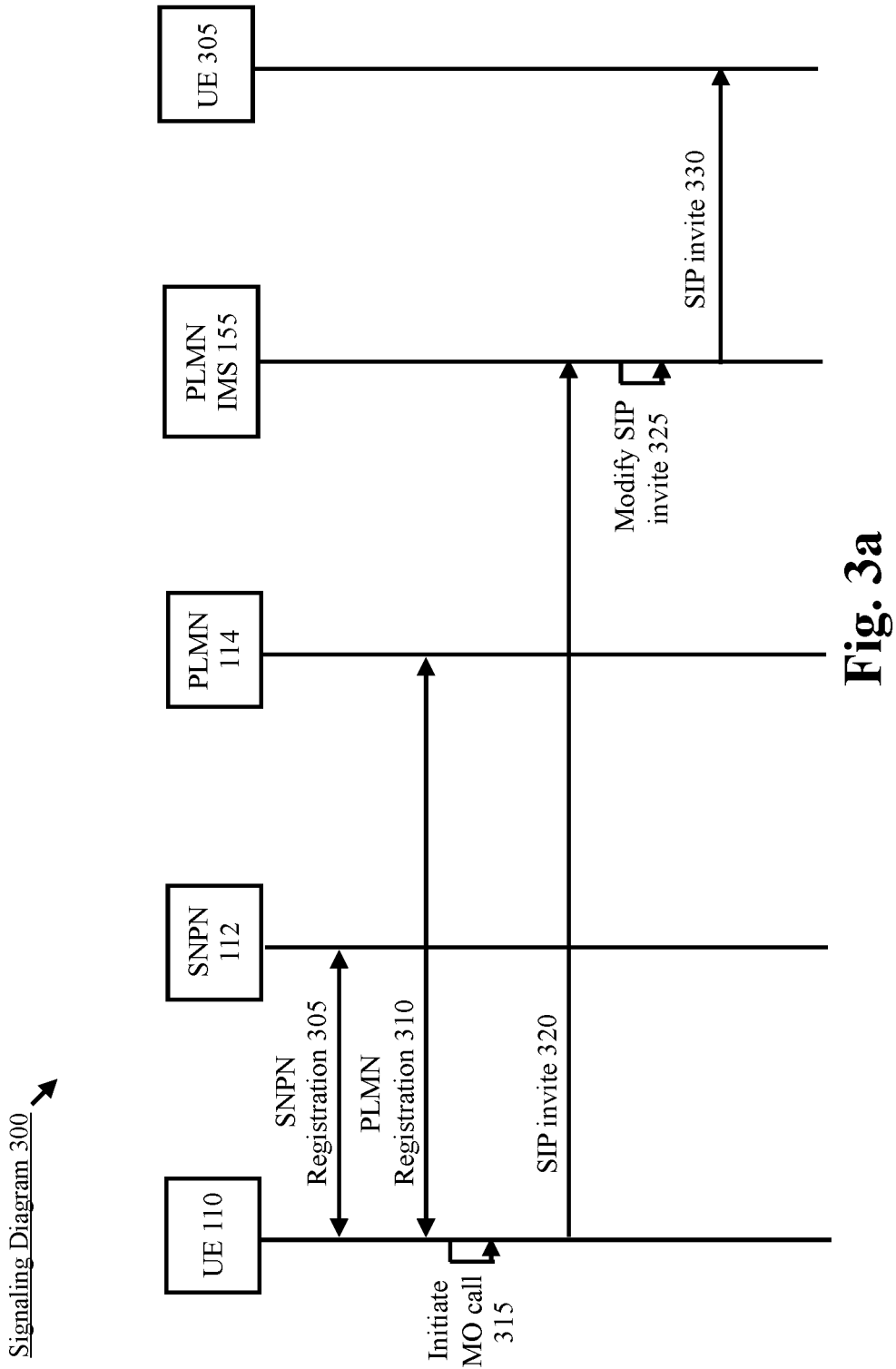
FIG. 3a shows a signaling diagram for session initiation protocol (SIP) signaling that may be used to establish a mobile originating (MO) call at the UE.

FIG. 3a shows a signaling diagram 300 for SIP signaling that may be used to establish a MO call at the UE 110. The signaling diagram 300 includes, the UE 110, the SNPN 112, the PLMN 114, the PLMN IMS 155 and a further UE 302.

In 305, the UE 110 registers with the SNPN 112. For example, the UE 110 may camp on the node 120A of the 5G NR RAN 120. When camped, the UE 110 and the SNPN 112 may participate in a signaling exchange to register the UE 110 with the SNPN 112 and establish the appropriate context within the SNPN core network 130.

In 310, the UE 110 registers with the PLMN 114. For example, once registered with the SNPN 112, the UE 110 may access the PLMN 114 via the SNPN 112 and the data network 140. The UE 110 and the PLMN 114 may participate in a signaling exchange to register the UE 110 with the PLMN 114 and establish the appropriate context within the PLMN core network 150. This may also include registering the UE 110 with the PLMN IMS 155. Accordingly, at this time, the PLMN IMS 155 may be aware that the UE 110 is connected to the SNPN 112 or at least has access to this information via the PLMN core network 150.

In 315, the UE 110 initiates a MO call. For example, in response to user input at the UE 110, the UE 110 may initiate the SIP signaling for the MO call. In another example, the UE 110 may be equipped with sensors that trigger the UE 110 to automatically initiate the SIP signaling for a MO call when certain conditions are present.

In 320, the UE 110 transmits a SIP invite to the further UE 302. Since voice services are being facilitated by the PLMN 114, the SIP invite may be routed to the further UE 302 via the PLMN IMS 155. This SIP invite may utilize the following exemplary URI format: sip:device_id@ims.mnc(SNPN) .mnc(PLMN).mcc(PLMN).3gppnetwork.org. The "sip:" portion is customary for SIP signaling. The "device_id" portion may represent any appropriate identifier of the MT device (e.g., username, a subscription permanent identifier (SUPI), an international mobile subscriber identity (IMSI), a temporary MSI (TMSI), IP multimedia private identity (IMPI), etc.). The ".mnc(SNPN)" portion refers to the mobile network code (MNC) of the SNPN 112. Similarly, the ".mnc(PLMN)" portion refers to the MNC of the PLMN 114 and the .mcc(PLMN) portion refers to the mobile country code (MCC) of the PLMN 114. The ".3gppnetwork" portion indicates the involvement of a 3GPP based network (e.g., PLMN 114). Thus, the exemplary URI format may indicate to the PLMN IMS 155 that the MO call is originating from an endpoint of the SNPN 112.

In 325, the PLMN IMS 155 modifies the SIP invite. For example, the PLMN IMS 155 may be responsible for mapping between SNPN 112 and the PLMN 114. However, while the exemplary URI format may be used for SNPNs, the exemplary URI format may not be permitted for use in the PLMN 114. Thus, the PLMN IMS 155 may modify the SIP invite received from the UE 110 from the exemplary URI format to the 3GPP standard SIP URI format such that the SIP invite can be sent out over the PLMN 114 to the further UE 302. Accordingly, the PLMN IMS 155 may modify the SIP invite from a first URI format to a second URI format based on the target endpoint (e.g., UE 305).

The following is an example of a URI in accordance 3GPP standard format: sip:device_id@ims.mnc(PLMN).mcc(PLMN).3gppnetwork.org. Thus, the PLMN IMS 155 may change the URI format of the SIP invite to the 3GPP standard URI format. In this example, the PLMN IMS 155 may modify the SIP invite by removing or modifying the SNPN ID (MNC portion).

In 330, the PLMN IMS 155 forwards the SIP invite to the UE 302. Those skilled in the art will understand that other SIP signaling may occur to establish the communication session between the UE 110 and the UE 302.

Figure 3B:
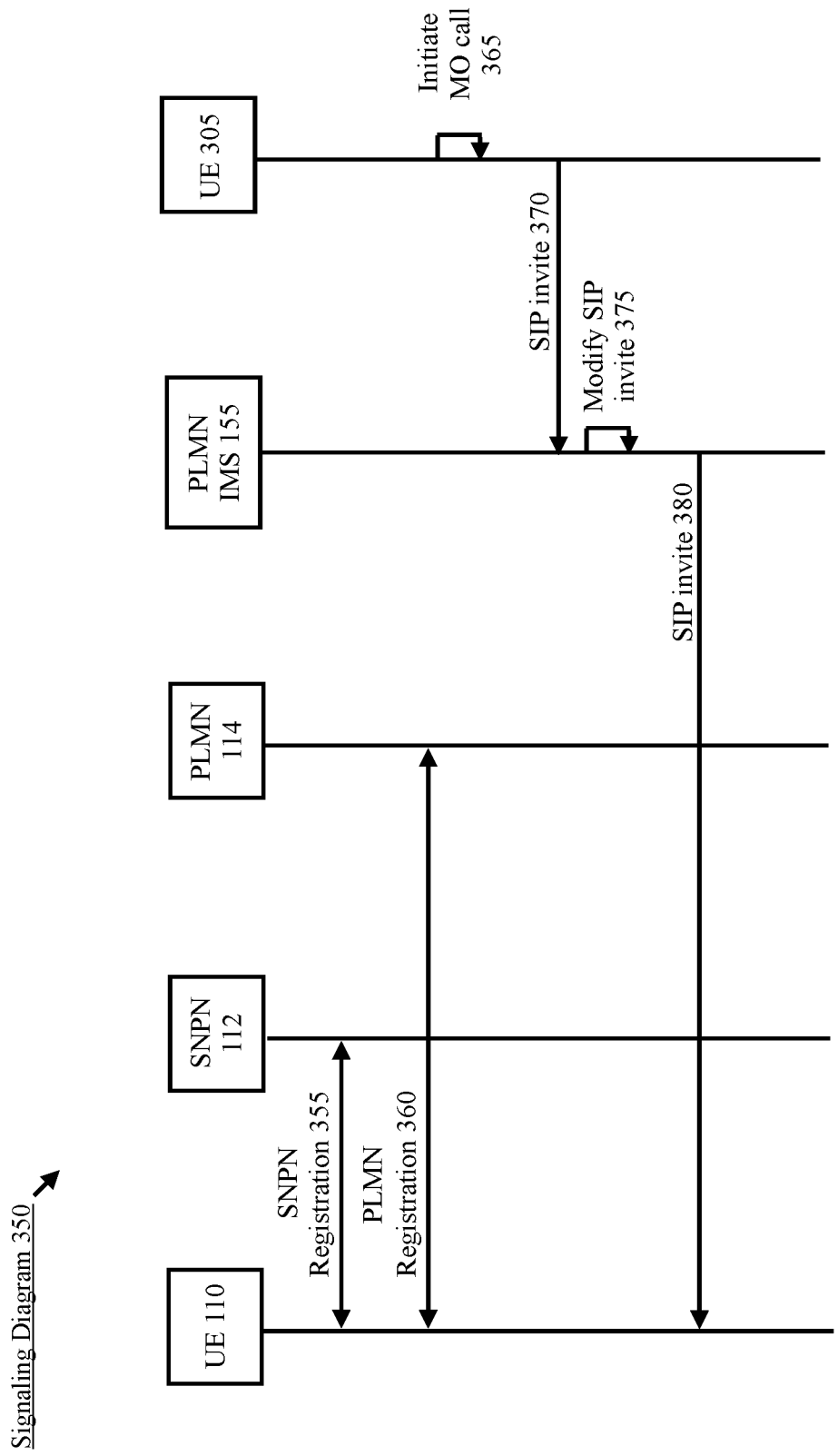
FIG. 3b shows a signaling diagram for SIP signaling that may be used to establish a mobile terminating (MT) call at the UE.

FIG. 3b shows a signaling diagram 350 for SIP signaling that may be used to establish a MT call at the UE 110. The signaling diagram 350 includes, the UE 110, the SNPN 112, the PLMN 114, the PLMN IMS 155 and a further UE 302.

In 355, the UE 110 registers with the SNPN 112. In 360, the UE 110 registers with the PLMN 114. 355-360 are substantially similar to 305-310 of the signaling diagram 300.

In 365, the further UE 302 initiates a MO call. For example, in response to user input at the further UE 302, the UE 302 may initiate the SIP signaling for the MO call.

In 370, the further UE 302 transmits a SIP invite to the UE 110. Since the voice call is being facilitated by the PLMN 114, the SIP invite may be routed to the UE 110 via the PLMN IMS 155. This SIP invite may utilize the 3GPP standard URI (sip:device_id@ims.mnc(PLMN).mcc(PLMN).3gppnetwork.org) because it is originating from the UE 302 which is not connected to the SNPN 112. Thus, the PLMN IMS 155 knows the SIP invite originated from a UE that is not connected to the SNPN 112 (e.g., further UE 302).

In 375, the PLMN IMS 155 modifies the SIP invite. For instance, the PLMN IMS 155 may modify the standard 3GPP URI format to the exemplary URI format: sip:device_id@ims.mnc(SNPN).mnc(PLMN).mcc(PLMN).3gppnetwork. In the example of the signaling diagram 300, the PLMN IMS 155 modifies the SIP invite by removing the SNPN ID (MNC portion) from the SIP transmitted in the exemplary URI format to comply with the 3GPP standard format. In this example, the PLMN IMS 155 modifies the SIP invite received in the 3GPP standard URI format by adding the SNPN ID (MNC portion) to create a SIP invite in accordance with the exemplary URI format. Accordingly, the PLMN IMS 155 may modify the SIP invite from a first URI format to a second URI format based on the target endpoint (e.g., UE 110).

In 380, the PLMN IMS 155 forwards the SIP invite to the UE 110. Those skilled in the art will understand that other SIP signaling may occur to establish the communication session between the UE 110 and the UE 302.

The signaling diagrams 300 and 350 described modifying the SIP invite by adding or removing the SNPN ID (MNC portion) of the SIP invite. However, the specific exemplary URI format and manner in which the SIP invite is modified is merely provided for illustrative purposes. The exemplary concept described herein of the PLMN IMS 155 modifying the SIP invite and then transmitting the SIP invite out over the SNPN 112 or the PLMN 114 may apply to any scenario in which a SNPN implements a URI format that is different than the URI format utilized by a PLMN.

In a second aspect, the exemplary embodiments relate to providing the UE 110 with PLMN services while connected to the SNPN 112. To facilitate this functionality various network functions on the SNPN 112 side and the PLMN 114 side may work together. Specific examples are described below in FIGS. 4-8 using a schematic overview 400 and signaling diagrams 500-800. However, throughout this description, any reference to a particular communication interface or network function performing a particular type of task on either the SNPN 112 side or the PLMN 114 side is merely provided for illustrative purposes. Different entities may refer to similar concepts by a different name.

Figure 4:
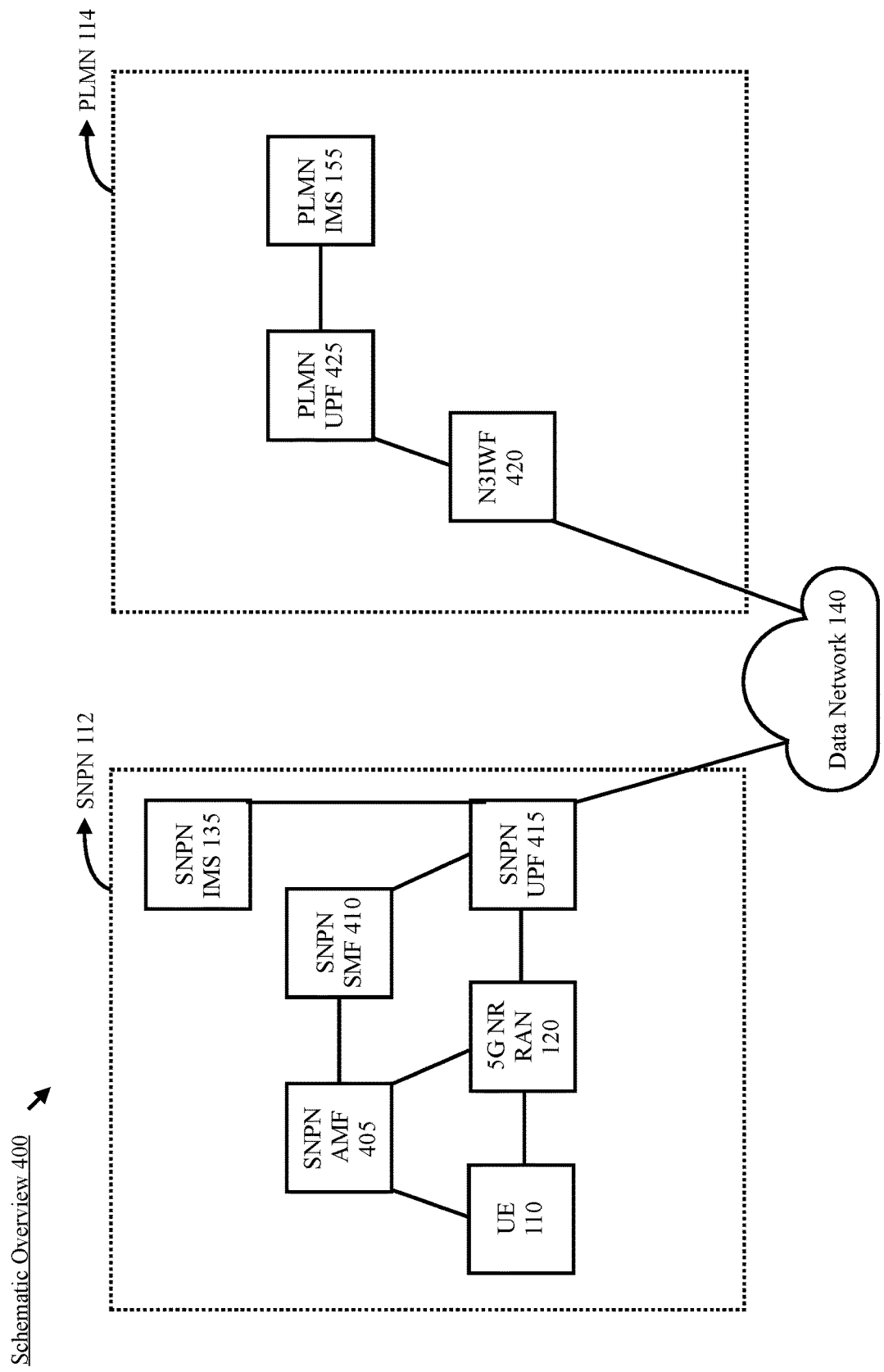
FIG. 4 shows a schematic overview of an exemplary arrangement of network functions configured to provide the UE with access to public land mobile network (PLMN) services while connected to the stand-alone non-public access network (SNPN).

FIG. 4 shows a schematic overview 400 of an exemplary arrangement of network functions configured to provide the UE 110 with access to PLMN services while connected to the SNPN 112. The schematic overview 400 will be described with regard to the network arrangement 100 of FIG. 1 and the UE 110 of FIG. 2.

Like the network arrangement 100, the schematic overview shows the SNPN 112 and the PLMN 114. In this example, the SNPN 112 side includes the UE 110, the 5G NR RAN 120, a SNPN access and mobility management (AMF) 405, an SNPN session management function (SMF) 410, an SNPN user plane function (UPF) 415 and the SNPN IMS 135.

The UE 110 may connect to the 5G NR RAN 120. Both the UE 110 and the 5G NR RAN 120 may communicate directly with the AMF 405. For example, the UE 110 may communicate with the SNPN AMF 405 over a N1 interface and the 5G NR RAN 120 may communicate with the SNPN AMF 405 over a N2 interface.

The SNPN AMF 405 may perform operations related to mobility management such as, but not limited to, paging, non-access stratum (NAS) management and registration procedure management between the UE 110 and the SNPN core network 130. The SNPN AMF 405 may be equipped with one or more communication interfaces (e.g., N1, N2, etc.) to communicate directly or indirectly with other internal and external network components (e.g., network functions, RANs, UEs, etc.). The exemplary embodiments are not limited to an AMF that performs the above referenced operations. Those skilled in the art will understand the variety of different types of operations an AMF may perform. Further, reference to a single SNPN AMF 405 is merely for illustrative purposes, an actual network arrangement may include any appropriate number of AMFs.

The SNPN AMF 405 may also communicate directly with the SNPN SMF 410. For example, the SNPN AMF 405 may communicate with the SNPN SMF 410 over a N11 interface.

The SNPN SMF 410 may perform operations related to session management such as, but not limited to, session establishment, session release, IP address allocation, policy and quality of service (QoS) enforcement, etc. The SNPN SMF 410 may be equipped with one or more communication interfaces (e.g., N11, etc.) to communicate directly or indirectly with other internal and external network components (e.g., network functions, RANs, UEs, etc.). The exemplary embodiments are not limited to an SMF that performs the above referenced operations. Those skilled in the art will understand the variety of different types of operations a SMF may perform. Further, reference to a single SNPN SMF 410 is merely for illustrative purposes, an actual network arrangement may include any appropriate number of SMFs.

The SNPN SMF 410, the 5G NR RAN 120 and the SNPN IMS 135 may communicate directly with the SNPN UPF 415. For example, the SNPN SMF 410 may communicate with the SNPN UPF 415 over a N4 interface, the 5G NR RAN 120 may communicate with the SNPN UPF 415 over a N3 interface and the SNPN IMS 135 may communicate with the SNPN UPF 415 over a N6 interface.

The SNPN UPF 415 performs operations related packet data unit (PDU) session management. For example, the SNPN UPF 415 may facilitate a connection between the UE 110 and a data network 140 (e.g., Internet) via a N6 interface. The SNPN UPF 415 may be equipped with one or more communication interfaces (e.g., N3, N4, N6, etc.) to communicate directly or indirectly with other internal and external network components (e.g., network functions, RANs, UEs, etc.). The exemplary embodiments are not limited to an UPF that performs the above referenced operations. Those skilled in the art will understand the variety of different types of operations an UPF may perform. Further, reference to a single SNPN UPF 415 is merely for illustrative purposes, an actual network arrangement may include any appropriate number of UPFs.

The PLMN 114 side may include a non-3GPP interworking function (N3IWF) 420, a PLMN UPF 425 and the PLMN IMS 155. The PLMN UPF 425 performs operations substantially similar to the SNPN UPF 415. In this example, the PLMN UPF 425 may communicate directly with the N3IWF 210 via a N3 interface and the PLMN IMS 155 via a N6 interface. However, reference to a single PLMN UPF 425 is merely provided for illustrative purposes and actual network arrangement may include any appropriate number of UPFs.

The N3IWF 420 may perform operations related to providing non-3GPP access to the PLMN core network 150. For example, the N3IWF 420 may authenticate UEs that attempt to access the PLMN 114 via the Data network 140 without using a 3GPP standard based network. In this example, the N3IWF 420 is connected to the Data network 140 via a N6 interface. The exemplary embodiments are not limited to a N3IWF that performs the above reference operations. Those skilled in the art will understand the variety of different types of operations a N3IWF may perform. Further, reference to a single N3IWF 420 is merely for illustrative purposes, an actual network arrangement may include any appropriate number of N3IWFs.

As mentioned above, the SNPN 112 may interact with the PLMN 114 via the Internet (or any other appropriate type of data network). Specific examples of how the network functions on the SNPN 112 side and the PLMN 114 may interact with one another to provide the UE 110 with PLMN services while connected to the SNPN 112 will be described in more detail below with regard to the schematic overview 400 of FIG. 4 and signaling diagrams 500-800 of FIGS. 5-8.

Figure 5:
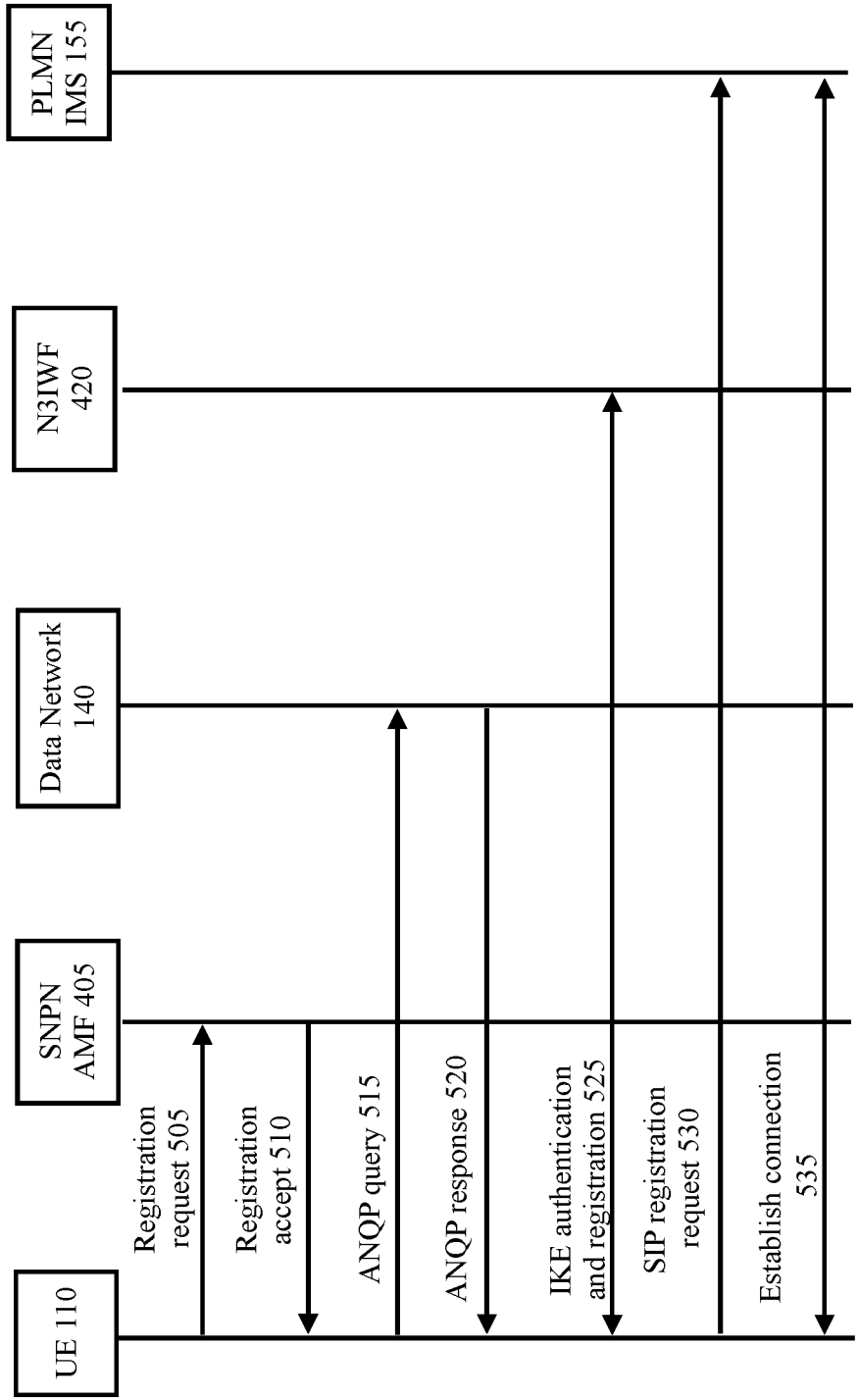
FIG. 5 shows a signaling diagram for providing the UE with access to the PLMN IP multimedia subsystem (IMS) according to various exemplary embodiments.

FIG. 5 shows a signaling diagram 500 for providing the UE 110 with access to the PLMN IMS 155 according to various exemplary embodiments. The signaling diagram 500 will be described with regard to the network arrangement 100 of FIG. 1, the UE 110 of FIG. 2 and the schematic overview 400 of FIG. 4.

The signaling diagram 500 relates to the UE 110 establishing a persistent connection to the PLMN IMS 155 through the N3IWF 420. Once connected, the UE 110 may access the PLMN IMS 155 and the UE 110 is reachable for external access by the PLMN 114 as well. Thus, the signaling diagram 500 shows how the UE 110 may establish a connection that enables the UE 110 to receive PLMN services (e.g., IP multimedia services, emergency services, etc.) via the SNPN 112.

The signaling diagram 500 includes the UE 110, the SNPN AMF 405, the data network 140, the N3IWF 420 and the PLMN IMS 155. In 505, the UE 110 transmits a registration request to the SNPN AMF 405. For example, after the UE 110 camps on the 5G NR RAN 120, the UE 110 may register with the SNPN AMF 405 to receive various services from the SNPN 112. The registration request may indicate that the UE 110 is interested in being configured with access to services (e.g., IMS) from an internal (SNPN) or external public network (e.g., PLMN 114).

In 510, the SNPN AMF 405 transmits a registration accept message to the UE 110. The registration accept message may indicate to the UE 110 that the SNPN 112 supports IP multimedia services (e.g., voice calls, video calls, etc.) and/or emergency services only from an external public network. Once registered with the SNPN AMF 405, the UE 110 may access the data network 140. For instance, within the context of the schematic overview 400, the SNPN AMF 140 may access the Data network 140 indirectly via the SNPN SMF 410 and the SNPN UPF 415. However, at this time, the UE 110 is not aware of the existence of the PLMN 114.

In 515, the UE 110 may query the Data network 140 for 3GPP cellular network information. For example, the UE 110 may transmit an access network query protocol (ANQP) signal to the Data network 140. In 520, the UE 110 may receive a response from the Data network 140. For example, in response to the ANQP query, the UE 110 may receive an ANQP response that indicates that the PLMN 114 may be accessible via the Data network 140 and the N3IWF 420. This indication may include information that allows the UE 110 to signal the PLMN 114 (e.g., IP address for the N3IWF 420, PLMN accessible). Thus, the exemplary embodiments relate to leveraging the ANQP query concept for N3IWF access.

In 525, the UE 110 and the PLMN 114 may participate in a signaling exchange for internet key exchange (IKE) authentication and registration. This may be similar to an IKE authentication and registration that is performed during network registration via non-3GPP access. Here, the SNPN 112 may represent the non-3GPP access network.

In the signaling diagram 500, the UE 110 is shown as performing this signaling exchange 525 with the N3IWF 420. However, those skilled in the art will understand that like the IKE authentication and registration procedure that is performed during network registration via non-3GPP access, the signaling exchange in 525 may also involve other network functions on the PLMN 114 side such as an AMF and an authentication server function (AUSF). After, the IKE authentication and registration procedure is successfully completed, the UE 110 may be connected to the N3IWF via the SNPN 112.

In 530, the UE 110 may transmit a SIP registration request to the PLMN IMS 155. The SIP registration request may reach the PLMN IMS 155 via the connection to the N3IWF 420. Further, the SIP registration request may be sent using the IP address assigned to the UE 110 during SNPN registration and thus, a new PDU session may not need to be created to access the PLMN IMS 155.

In 535, the UE 110 establishes a connection to the PLMN IMS 155. For example, the registration procedure initiated by the SIP registration request may be successfully completed based on a signaling exchange between the UE 110 and the PLMN IMS 155. This registration procedure may be similar to the registration procedure for voice over non-3GPP access. However, in this example, 530 and 535 are shown separately to emphasize that an advantage of the exemplary embodiments is that a new PDU session may not be needed to transmit the SIP registration request to the PLMN IMS 155.

Within the context of the schematic overview 400, the SNPN UPF 415 is shown as connecting the SNPN 112 network components to the Data network 140. Accordingly, those skilled in the art will understand that since the signaling shown in 515-535 flows out of the SNPN 112 to the Data network 140 and/or the PLMN 114, 515-535 may include user plane signaling.

As mentioned above, once connected using the signaling diagram 500, the UE 110 may access the PLMN IMS 155 and the PLMN IMS 155 may signal the UE 110. Thus, the UE 110 may now receive PLMN services (e.g., IP multimedia services, emergency services, etc.) via the SNPN 112.

Figure 6:
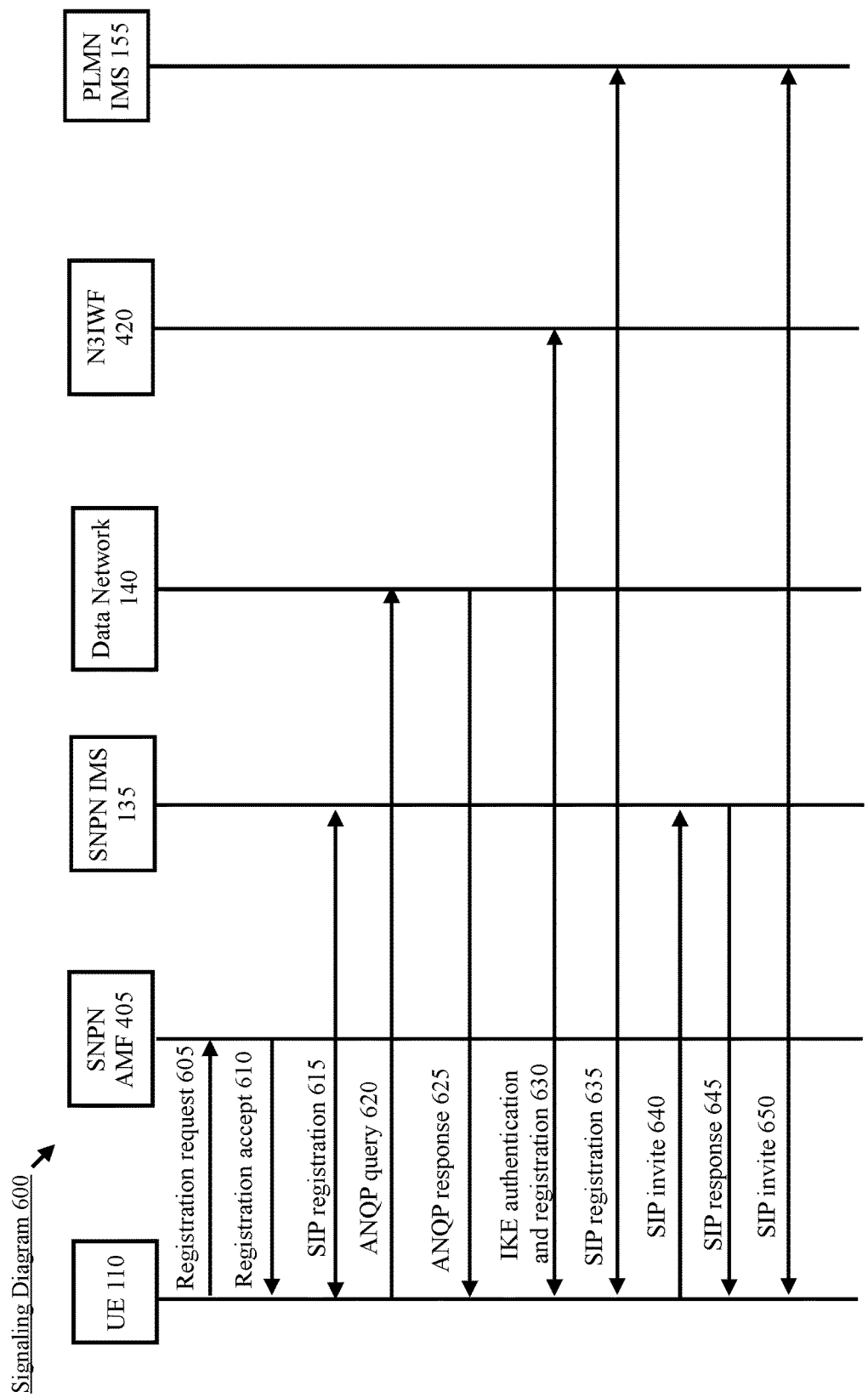
FIG. 6 shows a signaling diagram for providing the UE with access to the PLMN IMS according to various exemplary embodiments.

FIG. 6 shows a signaling diagram 600 for providing the UE 110 with access to the PLMN IMS 155 according to various exemplary embodiments. The signaling diagram 600 will be described with regard to the network arrangement 100 of FIG. 1, the UE 110 of FIG. 2 and the schematic overview 400 of FIG. 4.

The signaling diagram 600 relates to the UE 110 establishing internal IMS access (e.g. SNPN IMS 135) and external IMS access (e.g., PLMN IMS 155). This may enable the UE 110 to make calls to UEs connected to the SNPN 112 and to UEs connected to the PLMN 114.

The signaling diagram 600 includes the UE 110, the SNPN AMF 405, the SNPN IMS 135, the data network 140, the N3IWF 420 and the PLMN IMS 155. In 605, the UE 110 transmits a registration request to the SNPN AMF 405. For example, after the UE 110 camps on the 5G NR RAN 120, the UE 110 may register with the SNPN AMF 405 to receive various services from the SNPN 112. The registration request may indicate that the UE 110 is interested in being configured with access to services from an internal and/or external public network (e.g., PLMN 114).

In 610, the SNPN AMF 405 transmits a registration accept message to the UE 110. The registration accept message may indicate to the UE 110 that the SNPN 112 supports both i) internal IMS and/or emergency services and ii) external IMS and/or emergency services. This is in contrast to the example shown in the signaling diagram 500 where support for only external IMS and/or emergency services was indicated in the registration accept message.

In 615, the UE 110 performs SIP registration with the SNPN IMS 135. Once registered, the UE 110 may have IMS access with other UEs within the SNPN 112.

In 620, the UE 110 may query the Data network 140 for 3GPP cellular network information. For example, the UE 110 may transmit an access network query protocol (ANQP) signal to the Data network 140. In 625, the UE 110 may receive a response from the Data network 140. For example, in response to the ANQP query, the UE 110 may receive an ANQP response that indicates that the PLMN 114 may be accessible via the Data network 140 and the N3IWF 420. This indication may include information that allows the UE 110 to signal the PLMN 114 (e.g., IP address for the N3IWF 420).

In 630, the UE 110 and the N3IWF 420 may participate in a signaling exchange for IKE authentication and registration. This is substantially similar to 525 of the signaling diagram 500. In 635, the UE 110 and the PLMN IMS 155 perform SIP registration. At this time, the UE 110 is now configured with dual IMS registration, e.g., the SNPN IMS 135 and the PLMN IMS 155.

In 640, transmits a SIP invite corresponding to a call. Priority for calls may be configured for the internal network (e.g., SNPN 112) and thus, the SIP invite may be sent to the SNPN IMS 135 for routing. In this example, the SIP invite is addressed to an external network device such as a UE camped on the PLMN 114. In 645, the SNPN IMS 135 transmits a SIP response to the UE 110. In this example, since the call is directed towards an external network device, the SIP response may have a SIP response code of "380 alternative service." Conventionally, this SIP response code is used by SIP servers to indicate that the SIP server does not or cannot connect the call as requested but alternative services are possible. Accordingly, the exemplary embodiments relate to leveraging this type of SIP response to indicate to the UE 110 that the external SIP registration (e.g., 635) should be utilized for the SIP invite.

In 650, the UE 110 transmits a SIP invite to the PLMN IMS 155 for routing. Thus, in response to receiving the SIP response in 645, the UE 110 transmits a new SIP request to the external network. Subsequently, the SIP invite will be routed to the intended end point, e.g., a further UE camped on the PLMN 114, and a communication session may be established.

Figure 7:
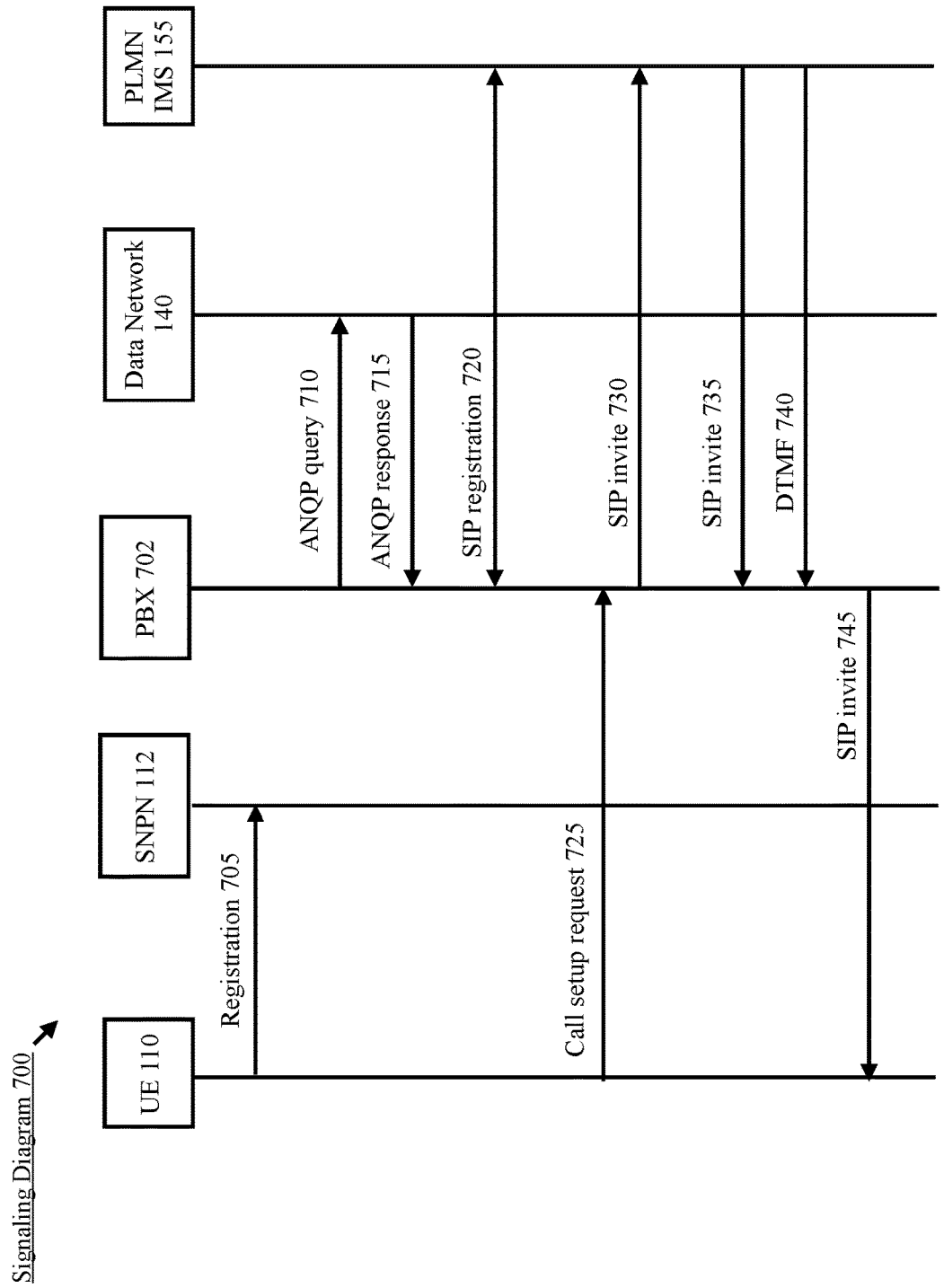
FIG. 7 shows a signaling diagram for providing the UE with access to the PLMN IMS via a private branch exchange (PBX) according to various exemplary embodiments.

FIG. 7 shows a signaling diagram 700 for providing the UE 110 with access to the PLMN IMS 155 via a private branch exchange (PBX) 702 according to various exemplary embodiments. The signaling diagram 700 will be described with regard to the network arrangement 100 of FIG. 1, the UE 110 of FIG. 2 and the schematic overview 400 of FIG. 4.

The signaling diagram 700 relates to SNPN 112 being equipped with PBX 702) 702. Those skilled in the art will understand that the PBX 702 may generally refer to a private telephone network. The PBX 702 may enable calls within the private telephone network using extensions and calls to external public networks. The PBX 702 may be integrated within the SNPN 112 using a server hosted locally by the private entity that deployed the SNPN 112 or using a cloud implementation such as a set of virtual or hardware servers hosting firmware.

The signaling diagram 700 includes the UE 110, the SNPN 112, the PBX 702, the Data network 140 and the PLMN IMS 155. In 705, the UE 110 registers with the SNPN 112 This may include being assigned with an IP address.

In 710, the PBX 702 may query the Data network 140 for 3GPP cellular network information. For example, the PBX 702 may transmit an ANQP signal to the Data network 140. In 715, the PBX 702 may receive a response from the Data network 140. For example, in response to the ANQP query, the PBX 702 may receive an ANQP response that indicates that the PLMN 114 may be accessible via the Data network 140 and the N3IWF 420. This indication may include information that allows the UE 110 to signal the PLMN 114 (e.g., IP address for the N3IWF 420).

In 720, the PBX 702 and the PLMN IMS 155 may perform SIP registration. For example, using the information received in the ANQP response, the PBX 702 may initiate SIP registration. Thus, the exemplary embodiments relate to leveraging the ANQP query concept for PBX SIP registration with the external IMS.

In this type of scenario, the UE 110 does not have direct availability of a link to the PLMN 114. Thus, to perform a call to an external network device, the UE 110 may have to go through the PBX 702.

In 725, the UE 110 transmits a call setup request to the PBX 702. This request may indicate to the PBX 702 that the UE 110 wants to establish a communication channel with a further UE that is not within the SNPN 112. In 730, the PBX 702 may transmit a SIP invite to the PLMN IMS 155 to establish a communication session for the UE 110. Thus, the UE 110 may receive on demand services to the external PLMN 114 via the PBX 702.

Further, in this type of scenario, a SIP invite for a MT call at the UE 110 will go through the PBX 702. This is shown by the SIP invite in 735. It should be noted that the SIP invite 730 is for a MO call by the UE 110 and the SIP invite 735 is for an MT call at the UE 110. These SIP invites are not related and are merely provided to demonstrate the functionality of the PBX 702 for a MO call and a MT call.

For an external device to reach the UE 110 once the SIP invite 735 is received by the PBX 702, the external device may also have to provide additional information such as the dual tone multi-frequency (DTMF) associated with the UE 110 (e.g. the extension). Thus, in 740, the PBX 702 receives the DTMF associated with the UE 110. In 745, the PBX 702 forwards the SIP invite to the UE 110 based on receiving the DTMF.

Figure 8:
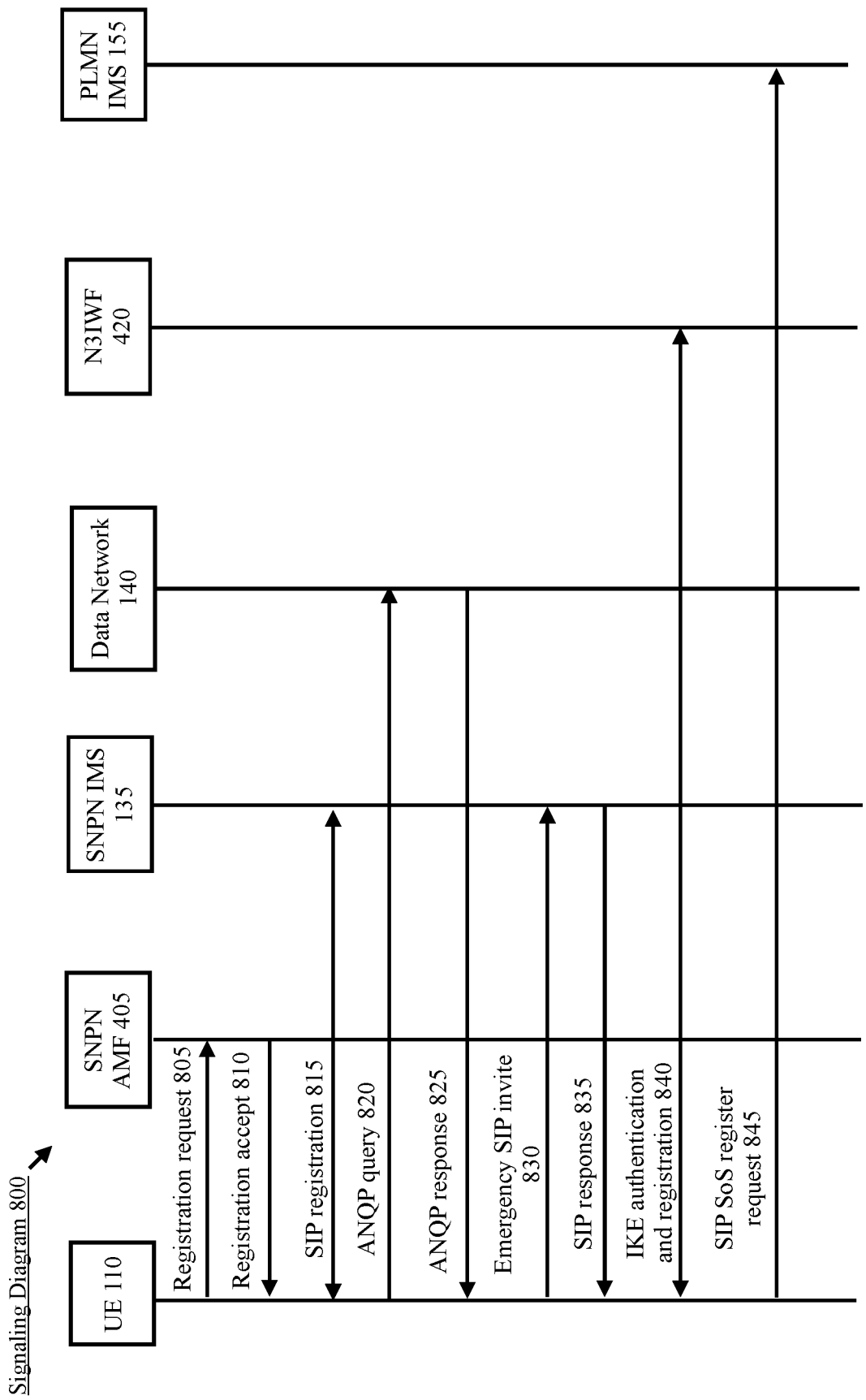
FIG. 8 shows a signaling diagram for providing the UE with access to the PLMN IMS only for emergency services according to various exemplary embodiments.

FIG. 8 shows a signaling diagram 800 for providing the UE 110 with access to the PLMN IMS 155 only for emergency services according to various exemplary embodiments. The signaling diagram 700 will be described with regard to the network arrangement 100 of FIG. 1, the UE 110 of FIG. 2 and the schematic overview 400 of FIG. 4.

The signaling diagram 800 relates providing access to the PLMN 114 for make emergency calls only. The signaling diagram 800 includes, the UE 110, the SNPN AMF 405, the SNPN IMS 135, the Data network 140, the N3IWF 420 and the PLMN IMS 155

In 805, the UE 110 transmits a registration request to the SNPN AMF 405. For example, after the UE 110 camps on the 5G NR RAN 120, the UE 110 may register with the SNPN AMF 405 to receive various services from the SNPN 112. The registration request may indicate that the UE 110 is interested in being configured with access to services from an external public network (e.g., PLMN 114).

In 810, the SNPN AMF 405 transmits a registration accept message to the UE 110. The registration accept message may indicate to the UE 110 that the SNPN 112 supports emergency services from an external public network.

In 815, the UE 110 performs SIP registration with the SNPN IMS 135. Once registered, the UE 110 may access other UEs within the SNPN 112.

In 820, the UE 110 may query the Data network 140 for 3GPP cellular network information. For example, the UE 110 may transmit an ANQP signal to the Data network 140. In 825, the UE 110 may receive a response from the Data network 140. For example, in response to the ANQP query, the UE 110 may receive an ANQP response that indicates that the PLMN 114 may be accessible via the Data network 140 and the N3IWF 420. This indication may include information that allows the UE 110 to signal the PLMN 114 (e.g., IP address for the N3IWF 420). At this time, the UE 110 is now aware of how to contact the PLMN IMS 155 to make an emergency call. However, since only emergency services are supported there is not a continuous link between the UE 110 and the PLMN 114 like there is in the signaling diagrams 500-600.

In 830, the UE 110 transmits an emergency SIP invite. Since there is no continuous link to the external PLMN 114, the emergency invite is routed to the SNPN IMS 155. In 835, the SNPN IMS 155 transmits a SIP response to the UE 110. For example, the SIP response may have a SIP response code of 380 alternative service indicating that the call should be made using external SIP registration.

In 840, the UE 110 and the N3IWF 420 may participate in a signaling exchange for IKE authentication and registration. The UE 110 is aware of how to contact the N3IWF 420 based on the ANQP query and response of 820-825.

In 845, the UE 110 transmits a SIP SoS register request to the PLMN IMS 155. Thus, the UE 110 is able to make the emergency call over the PLMN 114 while connected to the SNPN 112.

FIG. 9 shows a method 900 for selecting a PLMN to use for an emergency call according to various exemplary embodiments.

As mentioned above, the UE 110 may access PLMN services via the SNPN 112 or via a direct connection to a currently camped PLMN. The method 900 relates to how the UE 110 in SNPN access mode may select a PLMN to utilize for the emergency call.

In 905, an emergency call is initiated. For example, in response to user input at the UE 110, the UE 110 may initiate the SIP signaling for an emergency call. In another example, the UE 110 may be equipped with sensors that trigger the UE 110 to automatically initiate the SIP signaling for an emergency call when certain conditions are present. The exemplary embodiments apply to an emergency call being initiated for any appropriate reason.

In 910, the UE 110 determines whether the UE 110 is registered to an external IMS. For example, as described above with regard to the signaling diagrams 500-800, the UE 110 may be registered to utilize the PLMN IMS 155 while connected to the SNPN 112. If the UE 110 is registered to utilize an external IMS, the method 900 continues to 915. In 915, the UE 110 routes the emergency call to the external IMS. Subsequently, the method 900 ends.

If the UE 110 is not registered to utilize an external IMS, the method 900 continues to 920. In 920, the UE 110 determines whether one or more whitelisted PLMNs are available. For example, the carrier of the UE 110 may configure the UE 110 with access to an entitlement server. Those skilled in the art will understand that an entitlement server may generally refer to a network component that is configured to indicate to the UE 110 which PLMNs their carrier authorized for use. These PLMNs may be referred to as whitelisted PLMNs. Thus, since the UE 110 is in SNPN access mode and there is no available external IMS via the SNPN, the UE 110 may search for a PLMN to camp on.

In some embodiments, the UE 110 may already be provisioned with the identity of the whitelisted PLMNS prior to the initiation of the emergency call. In other embodiments, the UE 110 may query the entitlement server after the initiation of the emergency call. If the UE 110 is not configured with any whitelisted PLMNs, the method 900 continues to 925. Similarly, if the UE 110 determines the identify of one or more whitelisted PLMNs but the UE 110 is unable to detect any of the whitelisted PLMNs in a PLMN search, the method 900 continues to 925.

In 925, the UE 110 routes the emergency call over any available PLMN. For example, when the UE 110 is unable to detect a PLMN that the UE 110 is authorized utilize by their carrier, the UE 110 may be in limited service. When in limited service, the UE 110 may not be permitted to access the available PLMNs for a majority of services. However, the UE 110 may be permitted to access at least one of the PLMNs for emergency calls. Accordingly, in 925, the UE 110 may exhibit its normal behavior when in limited service and attempt to route the emergency call over any appropriate available PLMN.

Returning to 920, if the UE 110 determines that a whitelisted PLMN is available, the method 900 may continue to 930. At this time, the UE 110 is camped on a PLMN the UE 110 is authorized by their carrier to utilized. Accordingly, in 930, the UE 110 may route the emergency call over the currently camped whitelisted PLMN. Subsequently, the method 900 ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE) registered to a stand-alone non-public network (SNPN):
   transmitting an access network query protocol (ANQP) query to a data network;
   receiving an ANQP response from the data network in response to the ANQP query, wherein the ANQP response identifies a public land mobile network (PLMN) that is configured to be accessed by the UE via the data network and a non-third generation partnership program (3GPP) interworking function (N3IWF) of the PLMN; and
   transmitting a session initiation protocol (SIP) registration request to the PLMN via the data network using an internet protocol (IP) address assigned to the UE during a registration procedure with the SNPN.

2. The method of claim 1, further comprising:
   establishing a connection to an internet protocol (IP) multimedia subsystem (IMS) of the PLMN, wherein the UE is configured with voice services via the IMS of the PLMN.

3. The method of claim 1, further comprising:
   establishing a connection to an internet protocol (IP) multimedia subsystem (IMS) of the SNPN;
   establishing a connection to an IMS of the PLMN, wherein the UE is registered with the IMS of the SNPN and the IMS of PLMN simultaneously;
   transmitting a first SIP invite to the IMS of the SNPN;
   receiving a SIP response from the IMS of the SNPN; and
   transmitting a second SIP invite to the IMS of the PLMN based on receiving the SIP response from the IMS of the SNPN.

4. The method of claim 3, wherein the SIP response from the IMS of the SNPN includes a 380 alternative service SIP response code.

5. The method of claim 1, wherein the SIP registration request is for emergency services.

6. The method of claim 5, further comprising:
   establishing a connection to an internet protocol (IP) multimedia subsystem (IMS) of the SNPN prior to transmitting the SIP registration request;
   transmitting a SIP invite to the IMS of the SNPN; and
   receiving a SIP response from the IMS of the SNPN, wherein the SIP registration request is transmitted to the PLMN based on the SIP response received from the IMS of the SNPN.

7. A user equipment (UE), comprising:
   a transceiver configured to communicate with one or more networks; and
   a processor configured to perform operations, the operations comprising:
   registering with a stand-alone non-public network (SNPN);
   transmitting an access network query protocol signal (ANQP) query to a data network via the SNPN;
   receiving an ANQP response from the data network in response to the ANQP query, wherein the ANQP response identifies a public land mobile network (PLMN) that is configured to be accessed via the data network and a non-third generation partnership program (3GPP) interworking function (N3IWF) of the PLMN; and
   transmitting a session initiation protocol (SIP) registration request to the PLMN via the data network using an internet protocol (IP) address assigned to the UE during a registration procedure with the SNPN.

8. The UE of claim 7, the operations further comprising:
   establishing a connection to an internet protocol (IP) multimedia subsystem (IMS) of the PLMN, wherein the UE is configured with voice services via the IMS of the PLMN.

9. The UE of claim 7, the operations further comprising:
   establishing a connection to an internet protocol (IP) multimedia subsystem (IMS) of the SNPN;
   establishing a connection to an IMS of the PLMN, wherein the UE is registered with the IMS of the SNPN and the IMS of PLMN simultaneously;
   transmitting a first SIP invite to the IMS of the SNPN;

receiving a SIP response from the IMS of the SNPN; and
transmitting a second SIP invite to the IMS of the PLMN based on receiving the SIP response from the IMS of the SNPN.

10. The UE of claim 9, wherein the SIP response from the IMS of the SNPN includes a 380 alternative service SIP response code.

11. The UE of claim 7, wherein the SIP registration request is for emergency services.

12. The UE of claim 11, the operations further comprising:
    establishing a connection to an internet protocol (IP) multimedia subsystem (IMS) of the SNPN prior to transmitting the SIP registration request;
    transmitting a SIP invite to the IMS of the SNPN; and
    receiving a SIP response from the IMS of the SNPN, wherein the SIP registration request is transmitted to the PLMN based on the SIP response received from the IMS of the SNPN.

13. A method, comprising:
    at a private branch exchange of a stand-alone non-public network (SNPN):
        transmitting an access network query protocol signal (ANQP) query to a data network;
        receiving an ANQP response from the data network in response to the ANQP query, wherein the ANQP response identifies a public land mobile network (PLMN) that is configured to be accessed via the data network and a non-third generation partnership program (3GPP) interworking function (N3IWF) of the PLMN; and
        transmitting a session initiation protocol (SIP) registration request to the PLMN via the data network using an internet protocol (IP) address assigned to the UE during a registration procedure with the SNPN.

14. The method of claim 13, further comprising:
    receiving a call setup request from a user equipment registered with the SNPN; and
    transmitting a SIP invite to an internet protocol (IP) multimedia subsystem (IMS) of the PLMN in response to the cell setup request.

15. The method of claim 13, further comprising:
    receiving a SIP invite for a user equipment (UE) registered with the SNPN from the PLMN;
    receiving a signal associated with the UE from the PLMN; and
    forwarding the SIP invite to the UE based on the signal.

16. The method of claim 15, wherein the signal is a dual tone multi-frequency (DTMF) assigned to the UE.

* * * * *